United States Patent [19]

DiLello

[11] Patent Number: 5,704,156
[45] Date of Patent: Jan. 6, 1998

[54] FISH RETRIEVAL DEVICE

[76] Inventor: Remo DiLello, 225 Gravel Hill Rd., Huntingdon Valley, Pa. 19006

[21] Appl. No.: 412,144

[22] Filed: Mar. 28, 1995

[51] Int. Cl.⁶ .................................................. A01K 97/14
[52] U.S. Cl. .................................................. 43/5; 294/19.3
[58] Field of Search ................... 43/5, 6, 17.2; 294/19.3

[56] References Cited

U.S. PATENT DOCUMENTS

| 191,575 | 6/1877 | Eames | 294/193 |
| 1,049,875 | 1/1913 | Krueger | 43/5 |
| 1,982,132 | 11/1934 | Boles | 43/5 |
| 2,235,371 | 3/1941 | Jyrkas | 43/5 |
| 3,095,662 | 7/1963 | Puckett | 43/5 |
| 3,267,603 | 8/1966 | Josephs | 43/5 |
| 4,152,859 | 5/1979 | Hansen | 294/19.3 |

FOREIGN PATENT DOCUMENTS

| 0470199 | 12/1950 | Canada | 43/17.2 |
| 0899445 | 5/1945 | France | 43/5 |
| 0113557 | 3/1945 | Sweden | 294/19.3 |
| 1128638 | 9/1968 | United Kingdom | 43/17.2 |

OTHER PUBLICATIONS

M. Glaesner; Proper Boat Maneuvering: After the Hook Up; The Edge: Big Game Fishing Journal, 42, 48 (vol. 8 Issue II, 1995), pp. 43–49.

J. Brownlee; The Monsters of Madeira; Salt Water Sportsman (May 1995); 4 pages.

*Primary Examiner*—Joseph J. Hail, III
*Attorney, Agent, or Firm*—Joseph W. Molasky & Associates

[57] ABSTRACT

A device for retrieving a fish hooked to a fishing line comprising: a gripping mechanism for gripping the fish, a guide mechanism connected to the gripping mechanism for guiding the device along the line, and a retrieval mechanism operatively connected to the gripping mechanism for retrieving the device and the fish.

11 Claims, 5 Drawing Sheets

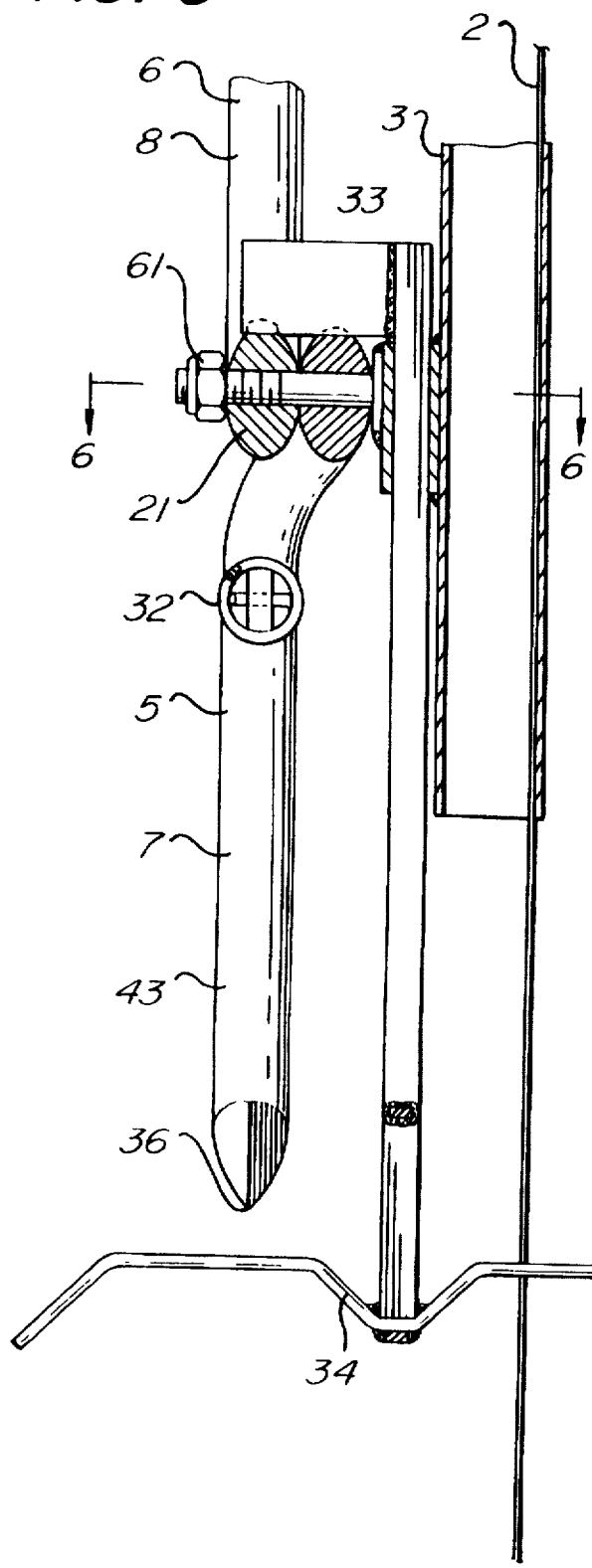
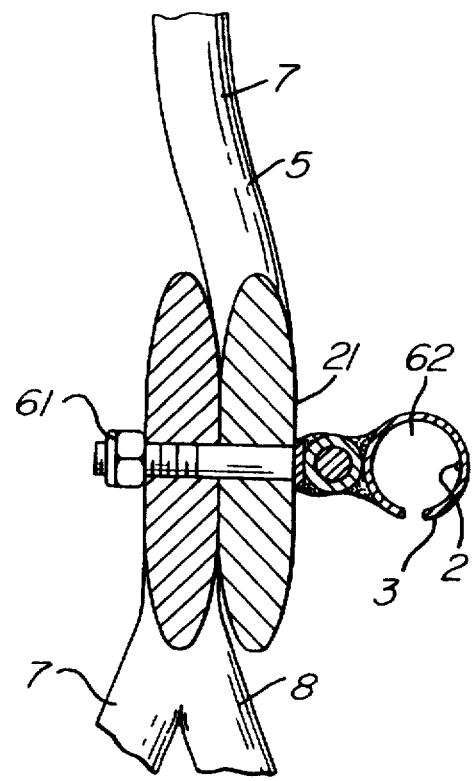

FISH RETRIEVAL DEVICE

BACKGROUND OF THE INVENTION

This invention relates generally to a device for boating a hooked fish.

More specifically, this invention relates to a tethered device which slides down a length of fishing line to engage, ensnare, and raise to boat level a fish which has been caught.

When fighting a large game fish, it can become entangled in the line or die of exhaustion or heart failure. Once dead, it may be difficult to bring to the surface and boat, particularly when time is of the essence because the fish can create a drag of such magnitude as to cause the line to snap.

In *The Edge Big Game Fishing Journal*, Vol. 8, Issue II, pages 42–48, (Spring, 1995), Captain Mike Glaesner describes, in an article entitled "Proper Boat Maneuvering: After the Hook Up", a technique and means for raising dead fish from the depths by maneuvering a boat in such manner as to plane the fish to the surface.

Basically, Captain Glaesner's technique consists of alternately accelerating and decelerating the boat while simultaneously reeling in the line during each deceleration so as to bring the fish closer. It is a slow and arduous process, and the risk of breaking the line is always present; however, according to the author, it is the only known means for bringing a dead fish to the surface without stressing the line.

Accordingly, there is need for a device which brings to the surface a dead or dying fish and which allows the operator to boat it without fear of losing the fish or equipment.

SUMMARY OF THE INVENTION

The present invention is directed to a tethered device for retrieving a fish which has been hooked.

The device consists essentially of three components: gripping means for ensnaring or gripping the fish, a guide means connected to the gripping means for guiding the device along the fishing line and retrieval means operatively connected to the gripping means for retrieving the device and the fish.

In practice, this device is attached to a cord or rope and it is threadedly engaged with the guide means so that it can follow the line and be brought into contact with the fish which is to be retrieved.

Once contact has been made, a trigger mechanism activates the device and brings the gripping means into engagement with the fish, and it does so in such a secure manner that the operator can use the cord or rope to haul the device and the fish to the surface either by hand or with a winch.

BRIEF DESCRIPTION OF THE DRAWINGS

This invention is best understood by reference to the following description and drawings where like reference numerals identify like elements:

FIG. 5 shows a cross-sectional view of the device near the pivot point; and

FIG. 6 shows a cross-sectional rear view of the device near the pivot point.

DETAILED DESCRIPTION OF THE INVENTION

The present invention is directed to a snaring device for retrieving a fish hooked on a fishing line. When fighting a large game fish, it can become entangled in the line and die, and this can create difficulties for the fisherman whose task it is to raise the dead or entangled fish to the surface. Moreover, the test strength of the fishing line may be insufficient to raise the fish.

The present invention overcomes these difficulties by providing a tethered device that can be lowered down a fishing line to "grab" the fish. Once the fish has been secured, the device and fish are hauled up with the tether by hand or with a winch. Thus, the fishing line need not be stressed. Of course, the device can also be used to secure the fish during a fight if the fish proves to be too aggressive or if the fight needs to be hastened.

This device consists essentially of three components: a gripping means for gripping the fish, guiding means connected to the gripping means for guiding the device along the fishing line, and retrieval means operatively connected to the gripping means for retrieving the device and the fish.

Figure 1:
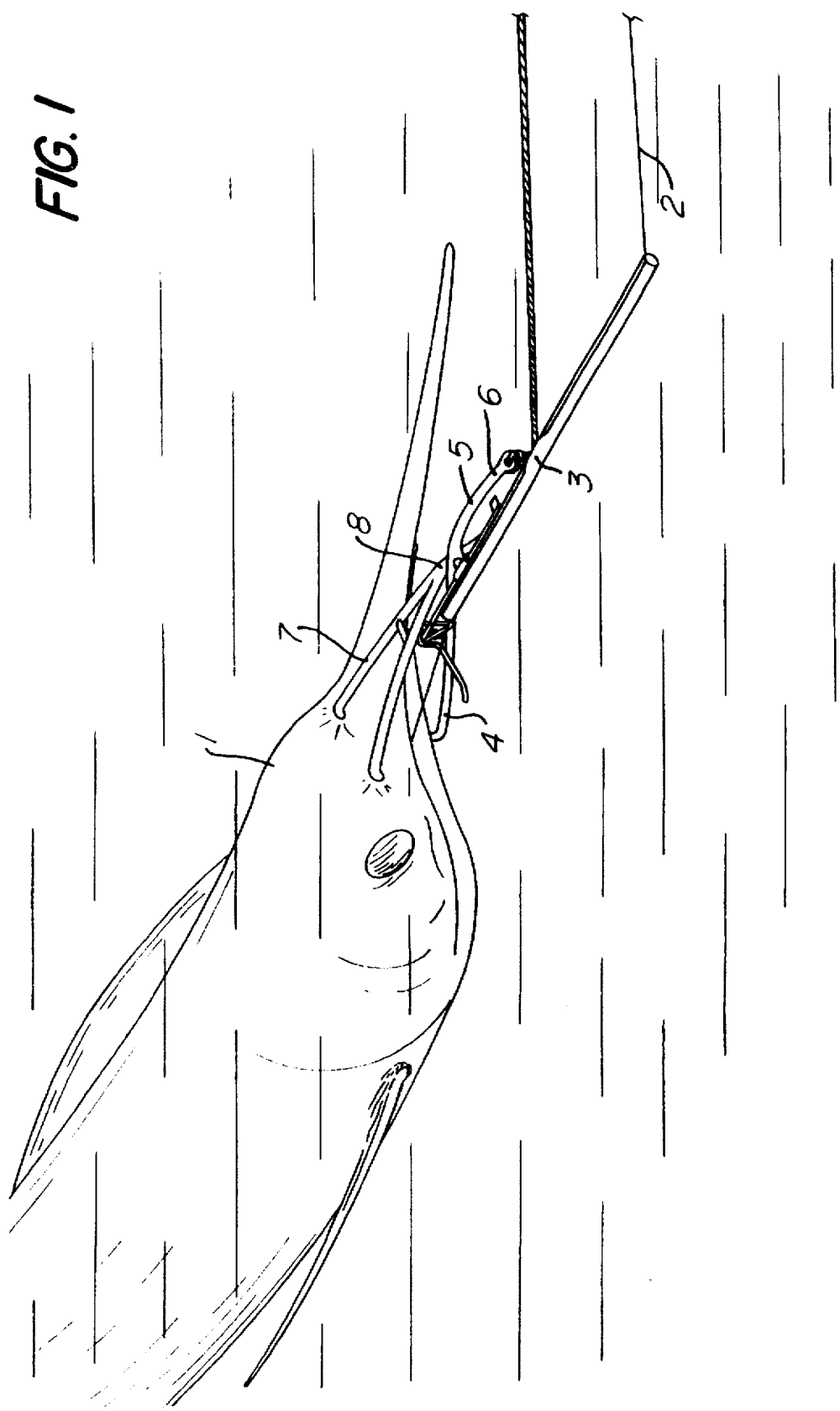
FIG. 1 shows a perspective view of the device in the released position gripping a fish.
Figure 2:
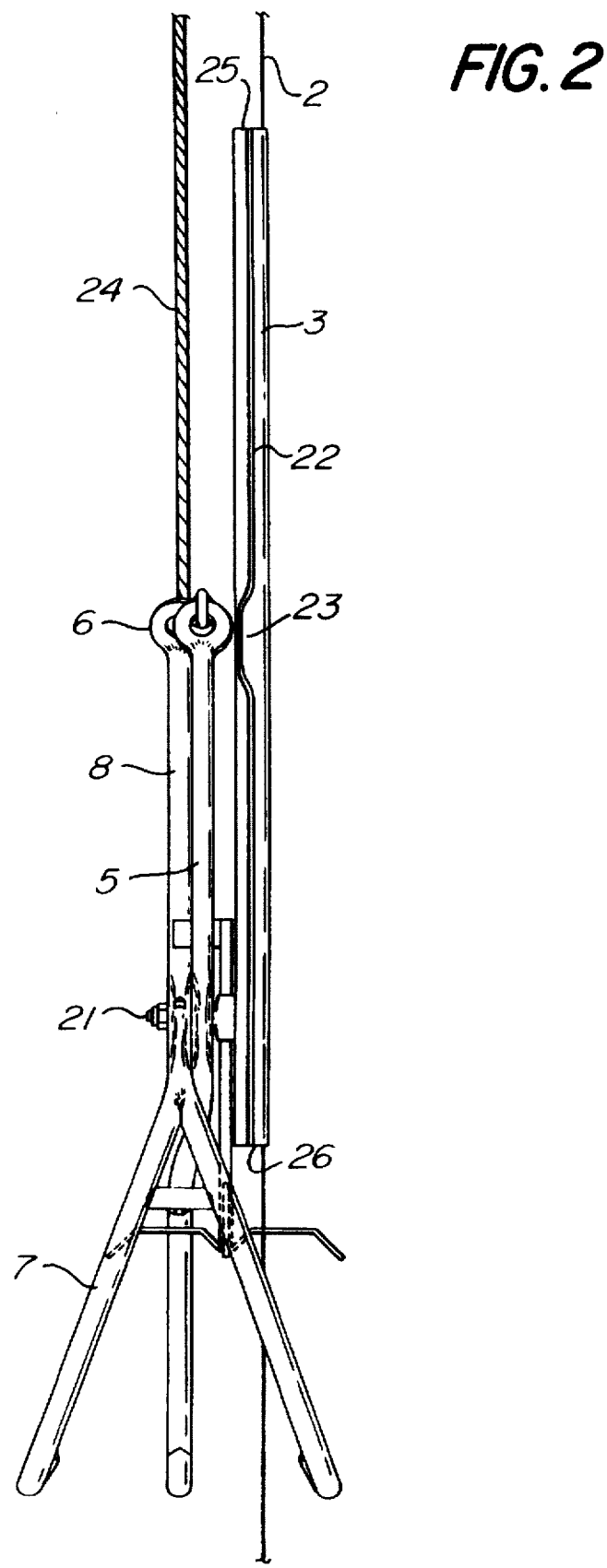
FIG. 2 shows a top view of the device.
Figure 3:
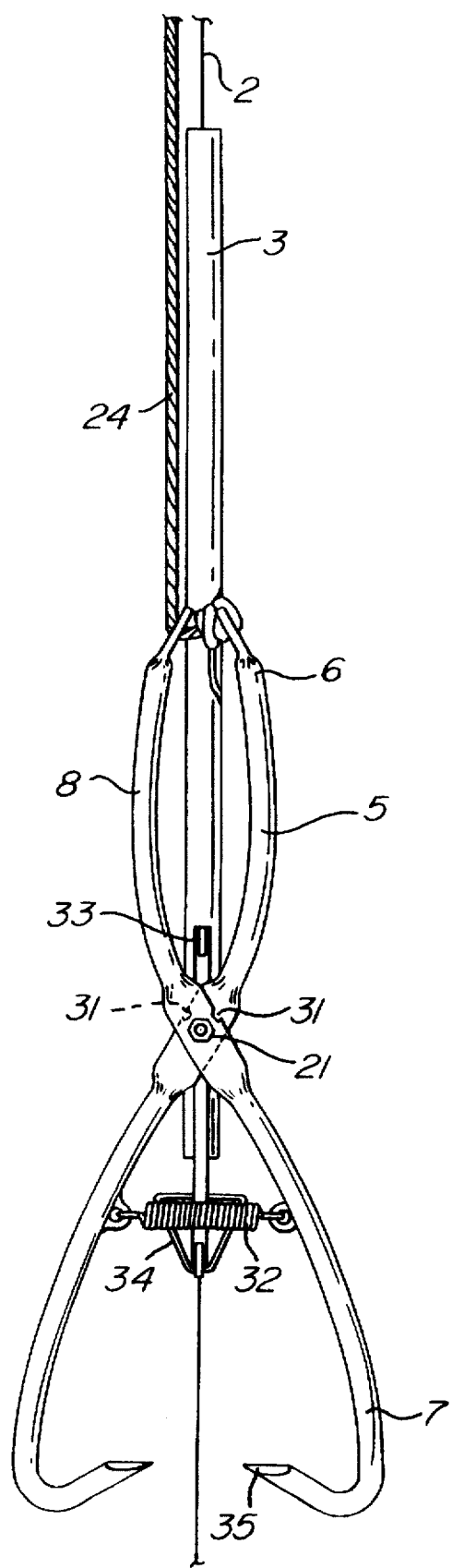
FIG. 3 shows a side view of the device in the released position.
Figure 4:
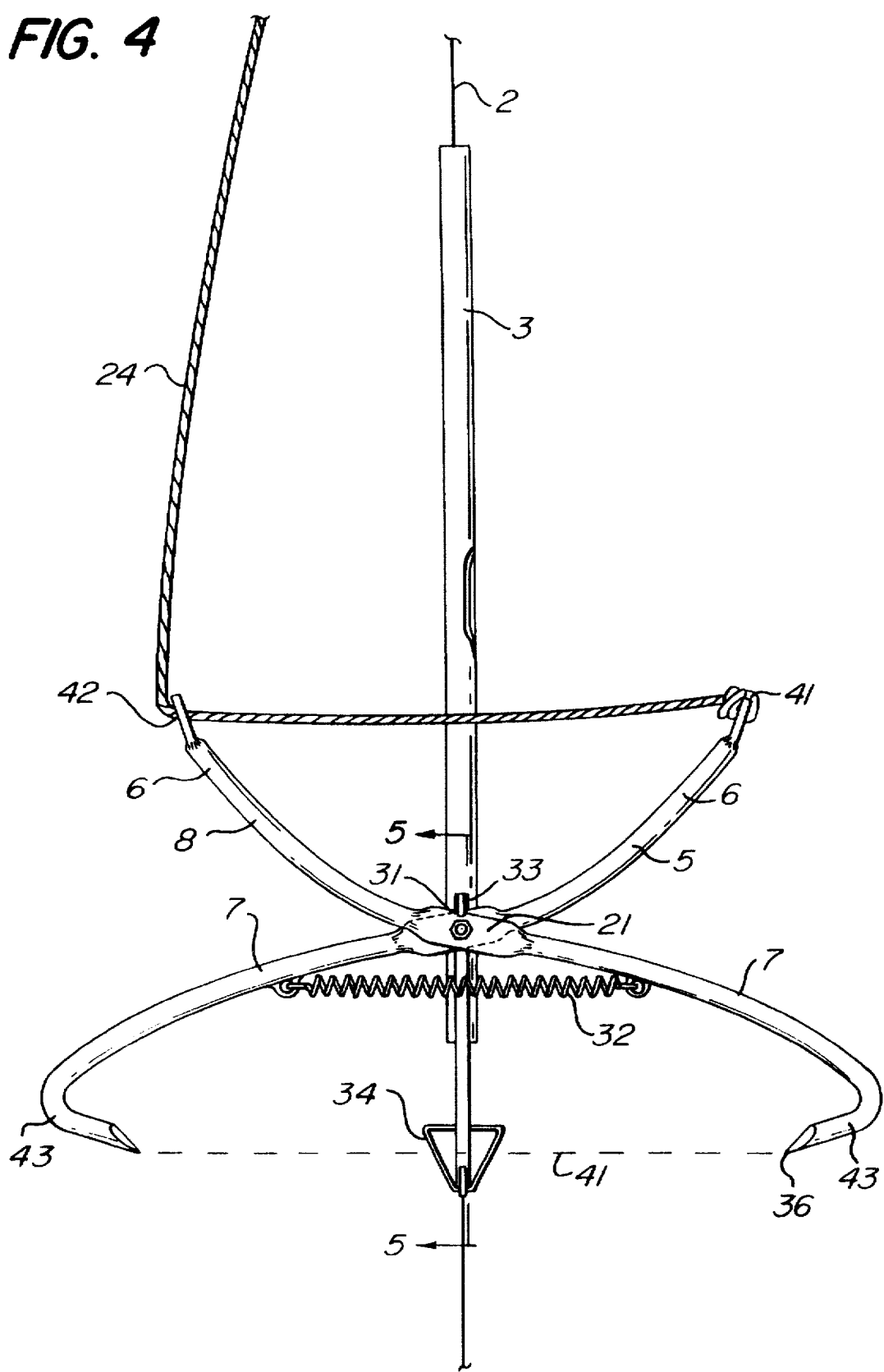
FIG. 4 shows a side of the device in the cocked position.

FIGS. 1 through 6 illustrate these components in detail. As shown in FIG. 4, the gripping means comprises at least two opposing gripping members 5,8 and resilient means 32 for urging the gripping members 5,8 together. The gripping members 5,8 have a cocked position such that the gripping members 5,8 form an opening 41 to receive the fish, and a released position (as shown in FIG. 3) such that the resilient means 32 urges the gripping members 5,8 together to grip the fish. FIG. 1 depicts the device gripping a fish 1 hooked on line 2.

Many variations of the gripping means are possible. In FIG. 4, each gripping member has a proximate end 7 and a distal end 6. The proximate end 7 has at least one prong 43 to grip the fish. In a preferred embodiment, the prong 43 has a point 36 to enhance the device's grip on the fish. FIG. 2 shows the device with two prongs 43 on gripping member 8 and one prong 43 on gripping member 5, but many variations are possible. Gripping members 5,8 are pivotally connected at a pivot point 21 between the ends 7 and 6. It should be understood that other embodiments are possible. For example, the gripping means may be a set of jaws with teeth similar to a bear trap, or it could be a spring loaded bar and a backing similar to a mouse trap. Indeed, any traditional means for trapping an animal can be used.

The gripping means may further comprise a release means for releasing the gripping members from the cocked position. The release is typically triggered by the device's contact with the fish. In one particular embodiment shown in FIG. 4, the release means comprises notches 31 in the gripping members 5,8 near the pivot point 21, a stop 33, and a trigger 34. The notches 31 align to form a groove to receive the stop 33 when the gripping members are in the cocked position (as shown). The trigger 34 is connected to the stop 33 and positioned in proximity to the opening 41 defined by the prongs 43. To ensure that it contacts the fish when the fish enters the opening 41, the trigger is designed to cover a relatively wide area. It is responsive to the fish such that it urges against the stop 33 upon contact with the fish to force the stop 33 from the groove thereby allowing the resilient means 32 to close the prongs 43 about the fish. Although this configuration represents a preferred embodiment of the invention, it should be understood that other release means are possible. An alternate embodiment may have the release means responsive to the user on the boat such that the user releases the gripping means when he believes the device has reached the fish. Such release means may be controlled by the retrieval means as described below. Alternatively, the release means may comprise a release mechanism similar to a bear trap or a mouse trap. The release means may also comprise an electronic sensor and release mechanism. The electronic sensor could signal the user that the device released and is ready for retrieval. Again, many alternatives are available to someone skilled in the art.

A key aspect of this invention is the ability of the guide means to follow the fishing line 2 to the disabled fish. FIG. 2 depicts one embodiment of the guide means. There, a guide member 3 is shown. The guide member 3 has open ends 25 and 26 and an inner channel 62 (shown in FIG. 6) through which the fishing line 2 passes. The weight of the device forces the device down the fishing line until it reaches the disabled fish. To aid the device's decent, additional weight can be added. The guide member 3 is fastened to the gripping means using a common fastener 61 as shown in FIG. 6. In the preferred embodiment of FIG. 4, guide member 3 maintains a substantially right angle relative to the opening 41.

Guide member 3 may also have a slot 22 running from end 25 to end 26 as shown in FIG. 2. The slot 22 provides access to the channel 62 such that a length of the fishing line 2 is insertable through the slot 22 into the channel 62. In other words, there is no need to "thread" the bitter end of the fishing line 2 through channel 62 from end 26 to end 25. Any interior section of the fishing line 2 can pass through the slot 22 to enter channel 62. This is an important feature since the bitter end of the fishing line is usually inaccessible, i.e., it lies within a spool. To prevent the fishing line 2 from passing through the slot 22 and thereby leaving the channel 62, the guide member 3 has obstruction means. The obstruction means can assume a variety of embodiments. In a preferred embodiment, obstruction means comprises a nonlinear slot. FIG. 2 shows a nonlinear slot comprising a key formation 23. It is difficult for a taut fishing line to pass through slot 22 having a key 23. Rather than a key 23, the nonlinear slot 22 may comprise an S-shaped slot. To someone skilled in the art, many variations of a non-linear slot would be obvious to prevent the line 2 from escaping channel 62. Alternatively, the obstruction means may comprise a collar having a second slot rotatably mounted to the guide member. When the second slot and the slot 22 are aligned in an access position, the fishing line can pass through the slot into the channel 62. However, when the second slot and the slot 22 are not in alignment, the obstruction means is in a lock position and the fishing line cannot pass through the slot 22.

Although a preferred embodiment of the guide means is shown in FIGS. 1 through 6, it should be understood that other embodiments are possible. For example, the guide means may comprise eyelets through which the line 2 can pass. These eyelets may have a clasp mechanism similar to a bracelet to allow an interior section of the fishing line to be threaded. Again, this avoids the need for the bitter end of the fishing line. Other guide means are certainly available to someone skilled in the art.

To retrieve the device and fish once it is deployed, the present invention has retrieval means. FIG. 4 shows an embodiment wherein the retrieval means comprises a line 24 connected to the gripping members 5 and 8. The line should have a test strength sufficient to lift the device and the fish. In a preferred embodiment, the line 24 is connected to the distal end 41 of a gripping member 5, and passes through the distal end 42 of an opposing gripping member 8 such that on the line 24 pulls the distal ends 41 and 42 together. Such a mechanism serves to increase the gripping pressure of prongs 43 which in turn enhances the grip on the fish.

The embodiment of the invention described above provides for a useful and convenient means of retrieving a hooked fish. Once the fisherman determines that the fish is tangled or dead or otherwise incapacitated, he slides the device down the line, grips the fish, and then retrieves the device with the fish in its grips. More specifically, the fisherman inserts the fishing line 2 through the slot 22 such that the fishing line 2 can slide through the channel 62. The device is sent down the line in the cocked position. The weight of the device allows it to slide down the fishing line 2 until it reaches the fish. Upon contact with the fish, trigger 34 pushes stop 33 backwards forcing it from the groove formed by notches 31 thereby releasing the gripping members 5 and 8. The resilient means 32 is then free to close prongs 43 about the fish 1. Sharp points 36 are designed to pierce the fish to enhance the gripping strength of the device. After the gripping members are released and the fish is secured by prongs 43, the device can be retrieved using line 24. Line 24 draws the distal ends 41 and 42 together to increase the grip on the fish 1. Because line 24 has high test strength, it can be pulled up by hand by several people or by mechanical means or by the use of block and tackly means. Thus, the device provides for retrieving an incapacitated fish without stressing the fishing lines beyond its designated limits.

While the preferred embodiments have been fully described and depicted for the purposes of explaining the principles of the present invention, it will be appreciated by those skilled in the art that modification and changes may be made thereto without departing from the scope of the invention set forth in the appended claims.

What is claimed is:

1. A fish retrieval device for retrieving a fish hooked on a fishing line, said device comprising:

(1) gripping means for gripping said fish, said gripping means comprising at least two opposing gripping members and resilient means for urging said gripping members together, said gripping members having a cocked position such that said gripping members form an opening to receive said fish and a released position such that said resilient means urges said gripping members together to grip said fish, said gripping means further comprising release means for releasing said gripping members from said cocked position, said release means being responsive to contact with said fish, each gripping member having a proximate end having at least one prong to grip said fish, and a distal end, said gripping members being pivotally connected at a point between said ends; said release means consisting essentially of said gripping members having one or more notches near said pivot point, a stop, and a trigger, said notches being aligned to receive said stop when said gripping members are in said cocked position, said trigger being connected to said stop and positioned in proximity to said opening when said gripping members are in said cocked position, said trigger being responsive to said fish such that said trigger urges against said stop upon contact with said fish to force said stop from said notches thereby allowing said resilient means to close said prongs about said fish;

(2) guiding means connected to said gripping means for guiding said device along said fishing line, said guide means comprising a guide member having open ends and an inner channel through which said fishing line passes, said guide member being connected to said gripping means to maintain a substantially right angle relative to said opening, said guide member having a slotted opening which extends from end to end to provide access to said channel such that a length of said fishing line is insertable through said slot into said channel, said guide member having obstruction means for obstructing a taut, straight fishing line from passing through said slot and thereby leaving said channel;

(3) retrieval means operatively connected to said gripping means for retrieving said device and said fish, said retrieval means comprising a line connected to said distal end of a gripping member and passing through said distal end of an opposing member such that tension on said line pulls said distal ends together.

2. The device of claim 1 wherein said obstruction means is comprised of a non-linear slotted opening.

3. The device of claim 2 wherein said non-linear slotted opening comprises a key.

4. A fish retrieval device for retrieving a fish hooked on a fishing line, said device comprising:

(1) gripping means for gripping said fish;
  (a) said gripping means being comprised of at least two opposed gripping members and resilient means for urging said gripping members together, said gripping members having a cocked position such that said gripping members form an opening to receive said fish and a release position such that said resilient means urges said gripping members together to grip said fish; each gripping member having a proximate end and at least one prong to grip said fish, and a distal end, said gripping members being pivotally connected at a point between said ends;
  (b) said gripping means being further comprised of release means for releasing said gripping members from said cocked position said release means comprising gripping members having one or more notches near said pivot point, a stop, and a trigger, said notches being aligned to receive said stop when said gripping members are in said cocked position, said trigger being connected to said stop and positioned in proximity to said opening when said gripping members are in said cocked position, said trigger being responsive to said fish such that said trigger urges against said stop upon contact with said fish to force said stop from said notches thereby allowing said resilient means to close said prongs about said fish;

(2) guiding means connected to said gripping means for guiding said device along said fishing line; and (3) retrieval means operatively connected to said gripping means for retrieving said device and said fish.

5. The device of claim 4 wherein said guide means comprises a guide member having opposite open ends and an inner channel through which said fishing line passes, said guide member being connected to said gripping means to maintain a substantially right angle relative to said opening.

6. The device of claim 5 wherein said guide member includes a slotted opening which extends from end to end to provide access to said channel such that an interior length of said fishing line is insertable through said slot into said channel.

7. The device of claim 6 wherein said guide member includes obstruction means for obstructing a taut, straight fishing line from passing through said slot and thereby leaving said channel.

8. The device of claim 7 wherein said obstruction means is comprised of a non-linear slotted opening.

9. The device of claim 8 wherein said non-linear slotted opening comprises a key.

10. The device of claim 4 wherein said retrieval means comprises a line connected to said gripping means, said line having a test strength sufficient to lift said device and said fish.

11. The device of claim 4 wherein said retrieval means comprises a line connected to said distal end of a gripping member and passing through said distal end of an opposing gripping member such that tension on said line pulls said distal ends together.

* * * * *